(12) United States Patent
Huang (10) Patent No.: US 12,385,620 B2
(45) Date of Patent: Aug. 12, 2025

(54) WARNING LIGHT (71) Applicant: Juluen Enterprise Co., Ltd., New Taipei (TW)

(72) Inventor: Yi-Ting Huang, New Taipei (TW)

(73) Assignee: Juluen Enterprise Co., Ltd., New Taipei (TW)

( * ) Notice: Subject to any disclaimer, the term of this patent is extended or adjusted under 35 U.S.C. 154(b) by 0 days.

(21) Appl. No.: 18/931,005

(22) Filed: Oct. 29, 2024

(65) Prior Publication Data

US 2025/0137609 A1 May 1, 2025

(30) Foreign Application Priority Data

Nov. 1, 2023 (TW) ................................. 112142070

(51) Int. Cl.
*F21S 43/20* (2018.01)
*B60Q 1/26* (2006.01)
*F21S 43/19* (2018.01)

(52) U.S. Cl.
CPC ........ *F21S 43/2815* (2024.05); *B60Q 1/2615* (2013.01); *F21S 43/195* (2018.01)

(58) Field of Classification Search
CPC ........ F21S 43/195; F21S 43/2815; F21S 4/20; F21S 4/22; B60Q 1/2615
USPC ................ 362/493, 495, 496, 542, 543, 545
See application file for complete search history.

(56) References Cited

U.S. PATENT DOCUMENTS

| | | | |
|---|---|---|---|
| 7,431,485 B1* | 10/2008 | Saward | B60Q 1/2611 362/504 |
| 2005/0018441 A1* | 1/2005 | Menke | B60Q 1/2611 362/493 |
| 2018/0172891 A1 | 6/2018 | Lee | |
| 2023/0036850 A1* | 2/2023 | Olsen | B60Q 1/2696 |
| 2025/0083592 A1* | 3/2025 | Dong | B60Q 1/2615 |

FOREIGN PATENT DOCUMENTS

| | | |
|---|---|---|
| TW | M412889 U1 | 10/2011 |
| TW | M454513 U1 | 6/2013 |
| TW | 1575187 B | 3/2017 |

* cited by examiner

*Primary Examiner* — Thomas M Sember
(74) *Attorney, Agent, or Firm* — Winston Hsu (57) ABSTRACT

A warning light includes a light case assembly and a light emitting assembly. The light case assembly includes a base, a covering component, a base plate, two fastening components and two shielding components. The covering component is made of resilient or deformable material and mounted on the base. The base plate and the light emitting assembly are disposed an accommodating space between the base and the covering component. The two fastening components pass through two fixing portions of the covering component, respectively. The two shielding components are mounted on the two fixing portions of the covering component for concealing the two fastening components, respectively. When the light case assembly is positioned on a surface of a vehicle body of the vehicle by the two fastening components, the covering component is resiliently deformed, such that the light case assembly is attached onto the surface of the vehicle body of the vehicle.

20 Claims, 7 Drawing Sheets

WARNING LIGHT

BACKGROUND OF THE INVENTION

1. Field of the Invention

The present invention relates to a warning light, and more specifically, to a warning light with extended service life.

2. Description of the Prior Art

There are more and more vehicles, e.g., cars, in curvy designs. However, most conventional warning lights are rigid and fail to be seamlessly attached onto curved surfaces of the vehicles. Therefore, even if the warning lights are forcibly mounted on the curved surfaces of the vehicles, the warning lights may be disengaged from the curved surfaces of the vehicles after a long-term usage.

Besides, the most conventional warning lights are configured to be mounted on the curved surfaces of the vehicles by fastening components, e.g., screw components. However, the fastening components are made of metal material and tend to corrode or damage due to a long-term exposure to wind and rain.

Accordingly, it becomes an important topic in the field to provide an improved warning light.

SUMMARY OF THE INVENTION

It is an objective of the present invention to provide a warning light with extended service life for solving the aforementioned problems.

In order to achieve the aforementioned objective, the present invention discloses a warning light. The warning light includes a light case assembly and a light emitting assembly. The light case assembly includes a base, a covering component, two fastening components and two shielding components. The base includes a base plate. The covering component is made of resilient or deformable material and mounted on the base. An accommodating space is formed between the base and the covering component. The covering component includes a main body and two fixing portions located adjacent to two lateral sides of the main body of the covering component, respectively, and each of the two fixing portions is configured to allow a fastening component to pass therethrough. The two fastening components pass through the two fixing portions of the covering component, respectively. The two shielding components are mounted on the two fixing portions of the covering component for concealing the two fastening components, respectively. The light emitting assembly is disposed inside the accommodating space. The light emitting assembly includes a flexible circuit board and at least one light emitting component disposed on the flexible circuit board. When the light case assembly is positioned on a surface of a vehicle body of a vehicle by the two fastening components, the covering component is configured to be resiliently deformed, such that the light case assembly is attached onto the surface of the vehicle body of the vehicle.

According to an embodiment of the present invention, a passing hole is formed on each of the two fixing portions of the covering component and configured to allow a corresponding one of the two fastening components to pass therethrough.

According to an embodiment of the present invention, at least one locking hole is formed on each of the two fixing portions of the covering component. Each of the two shielding components includes a base portion, at least one extending portion and at least one locking portion. The at least one extending portion extends from the base portion and is located at a position corresponding to the corresponding locking hole, and the at least one locking portion is disposed on an end of the at least one extending portion and configured to engage with the corresponding locking hole.

According to an embodiment of the present invention, each of the two fixing portions of the covering component includes at least one restraining edge located adjacent to an upper opening of the at least one locking hole. Each of the two shielding components further includes at least one restraining block extending from the base portion and the at least one extending portion and located at a position corresponding to the at least one restraining edge, and the at least one restraining block is configured to cooperate with the at least one restraining edge.

According to an embodiment of the present invention, the at least one restraining edge includes a first inclined surface, and the at least one restraining block includes a second inclined surface configured to abut against the first inclined surface.

According to an embodiment of the present invention, the warning light further includes a first heat dissipating plate and at least one second heat dissipating plate. The first heat dissipating plate and the at least one second heat dissipating plate are located at a bottom side of the flexible circuit board, the first heat dissipating plate is located between the flexible circuit board and the least one second heat dissipating plate. A first wiring hole is formed on the first heat dissipating plate and configured to allow a wire to pass therethrough, and a second wiring hole is formed on the at least one second heat dissipating plate and located at a position corresponding to the first wiring hole and configured to allow the wire to pass therethrough.

According to an embodiment of the present invention, at least one reinforcing rib protrudes from a bottom surface of the first heat dissipating plate and located beside the first wiring hole, and at least one accommodating notch is formed on the at least one second heat dissipating plate and configured to accommodate the at least one reinforcing rib.

According to an embodiment of the present invention, a thickness of the first heat dissipating plate and a thickness of the at least one second heat dissipating plate are 0.1 to 1.5 millimeters.

According to an embodiment of the present invention, the first heat dissipating plate, the at least one second heat dissipating plate and the base plate are made of metal material.

According to an embodiment of the present invention, the base further includes a protruding plate formed on a periphery of the base plate and extending upwardly from the base plate to stretch into the covering component.

According to an embodiment of the present invention, the covering component further includes at least one covering structure configured to cover the at least one light emitting component.

According to an embodiment of the present invention, the covering component further includes at least one positioning block located adjacent to at least one of the two lateral sides of the main body of the covering component and configured to abut against a surface of the flexible circuit board.

According to an embodiment of the present invention, the covering component further includes a sealing protruding edge configured to be attached onto the base plate and surround a periphery of the base plate.

According to an embodiment of the present invention, a penetrating hole is formed on the base plate and configured to allow a plurality of wires to pass therethrough, and a plurality of positioning holes are formed on the flexible circuit board and configured to allow the plurality of wires to pass therethrough.

According to an embodiment of the present invention, the light case assembly further includes a cushion pad mounted on a bottom surface of the base plate.

According to an embodiment of the present invention, the base further includes a positioning sleeve protruding from the bottom surface of the base plate downwardly, and a corresponding hole is formed on the cushion pad and configured to allow the positioning sleeve to pass therethrough.

According to an embodiment of the present invention, the base further includes at least one restraining protrusion protruding from at least one side of the positioning sleeve, and at least one restraining hole is formed on the cushion pad and configured to allow the at least one restraining protrusion to pass therethrough.

According to an embodiment of the present invention, two avoiding structures are formed on two lateral sides of the cushion pad, respectively, and each of the two avoiding structures is configured to allow a corresponding one of the two fastening components to pass therethrough.

According to an embodiment of the present invention, the two avoiding structures are two avoiding notches or two avoiding holes.

According to an embodiment of the present invention, the light case assembly further includes two fastening sleeves disposed on the two fixing portions of the covering component, respectively, and each of the two fastening sleeves is configured to allow a corresponding one of the two fastening components to pass therethrough for positioning the corresponding one of the two fastening components.

In summary, the present invention is configured to utilize the fastening component passing through the fixing portion for resiliently deforming the light case assembly in a curved shape and further to utilize the shielding component mounted on the fixing portion for concealing the fastening component to protect the fastening component from being corroded due to exposure to inclement weather with rain or wind. Therefore, the present invention has extended service life. In addition, the present invention is configured to utilize the light case assembly for resiliently deforming the first heat dissipating plate and the at least one second heat dissipating plate, so as to drive the base to resiliently deform to be seamlessly attached onto the surface of the vehicle body of the vehicle.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended mean to either indirect or direct an electrical/mechanical connection. Thus, if a first device is coupled to a second device, that connection may be through a direct electrical/mechanical connection, or through an indirect electrical/mechanical connection via other devices and connections.

Figure 1:
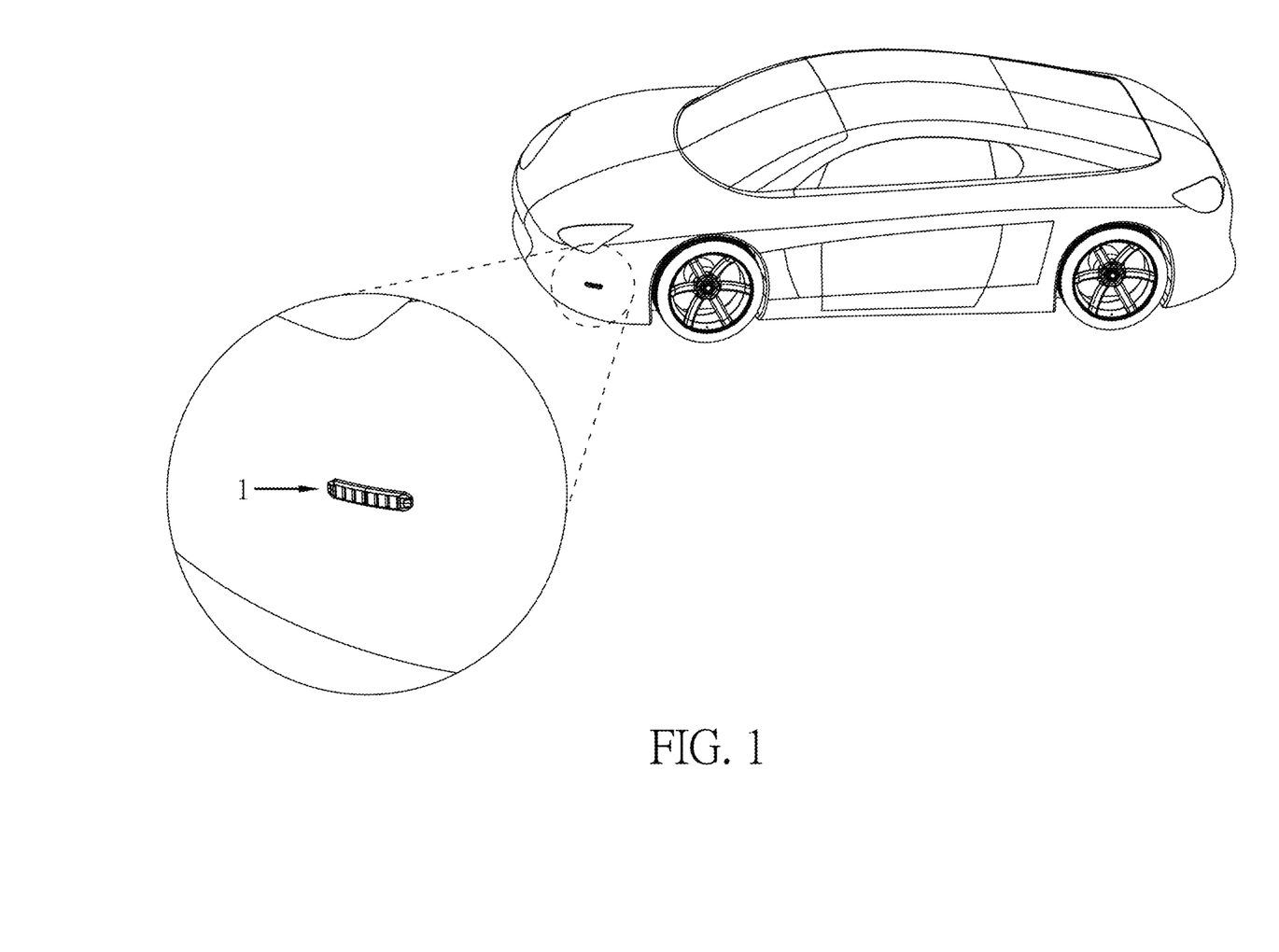
FIG. 1 is a diagram illustrating a warning light on a surface of a vehicle body of a vehicle according to an embodiment of the present invention.
Figure 2A:
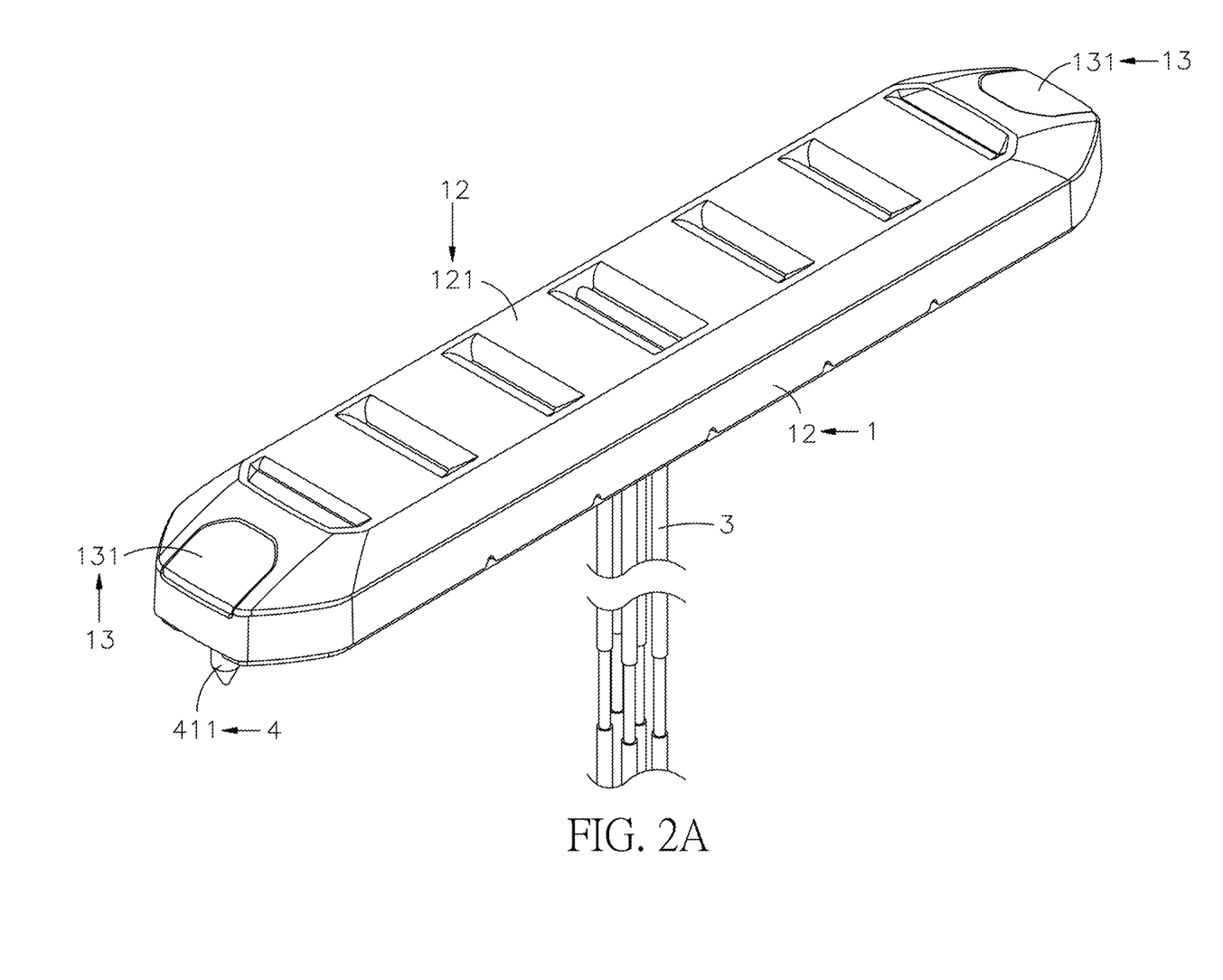
FIG. 2A and FIG. 2B are schematic diagrams of the warning light at different views according to the embodiment of the present invention.
Figure 2B:
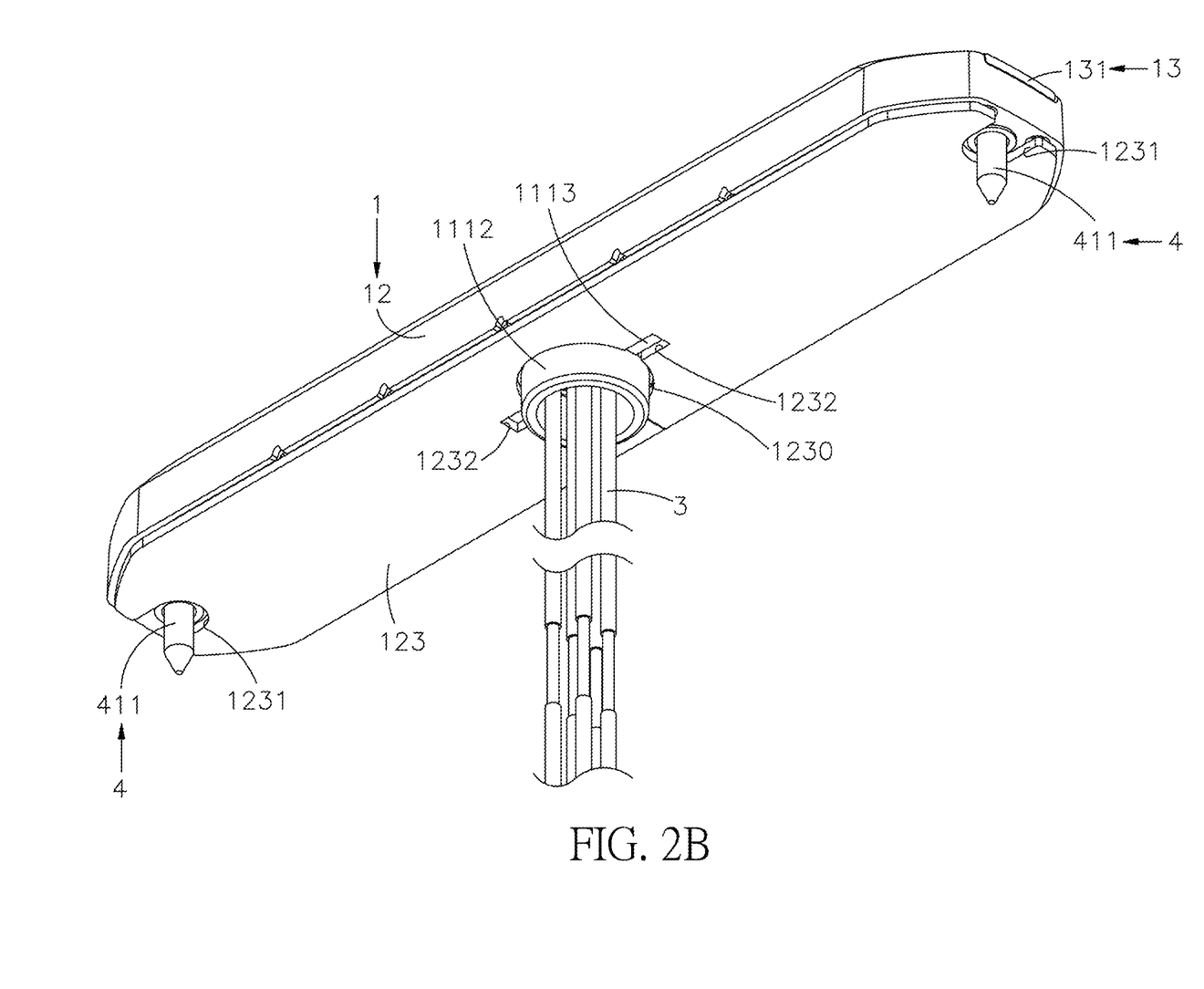
Figure 3:
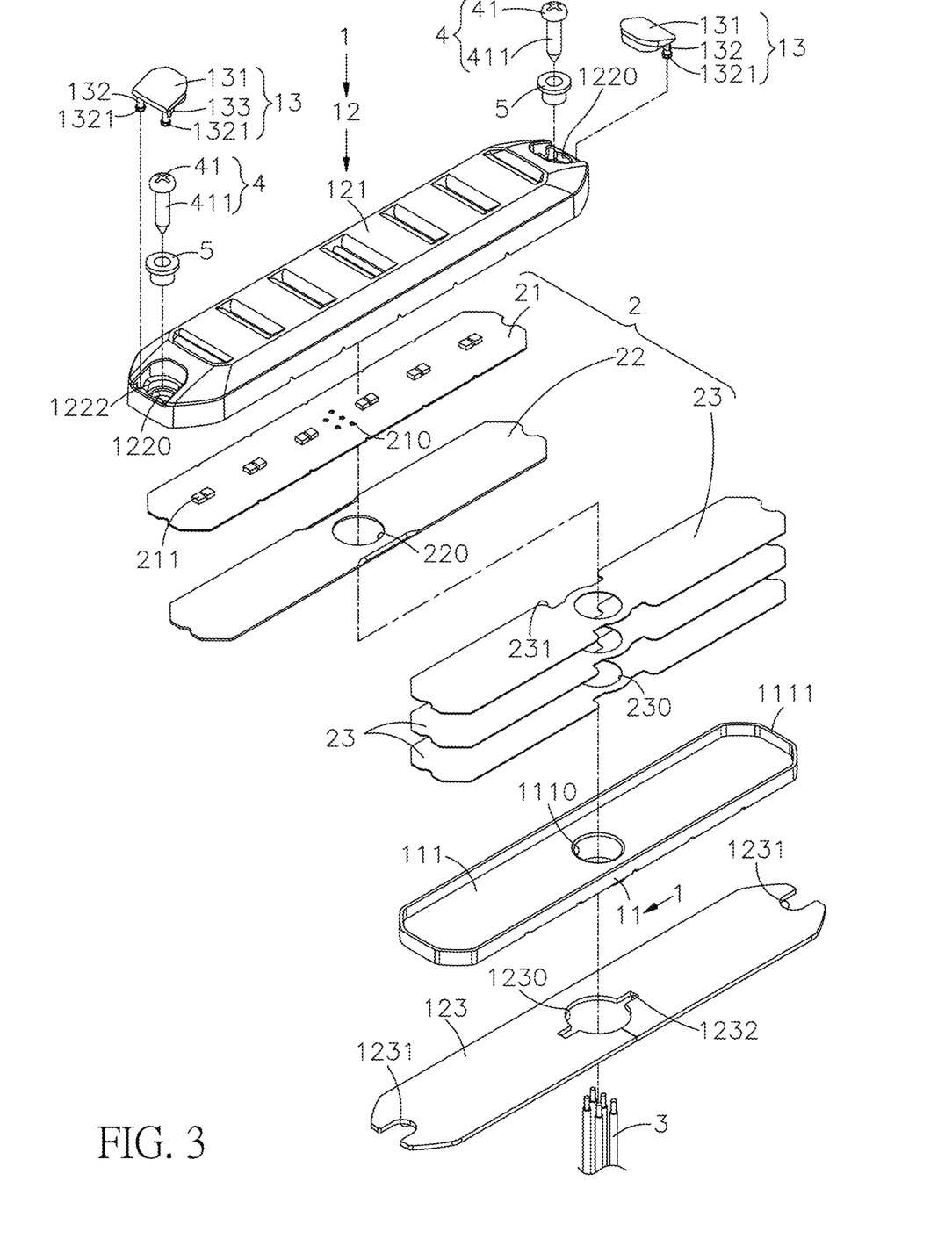
FIG. 3 and FIG. 4 are exploded diagrams of the warning light at different views according to the embodiment of the present invention.
Figure 4:
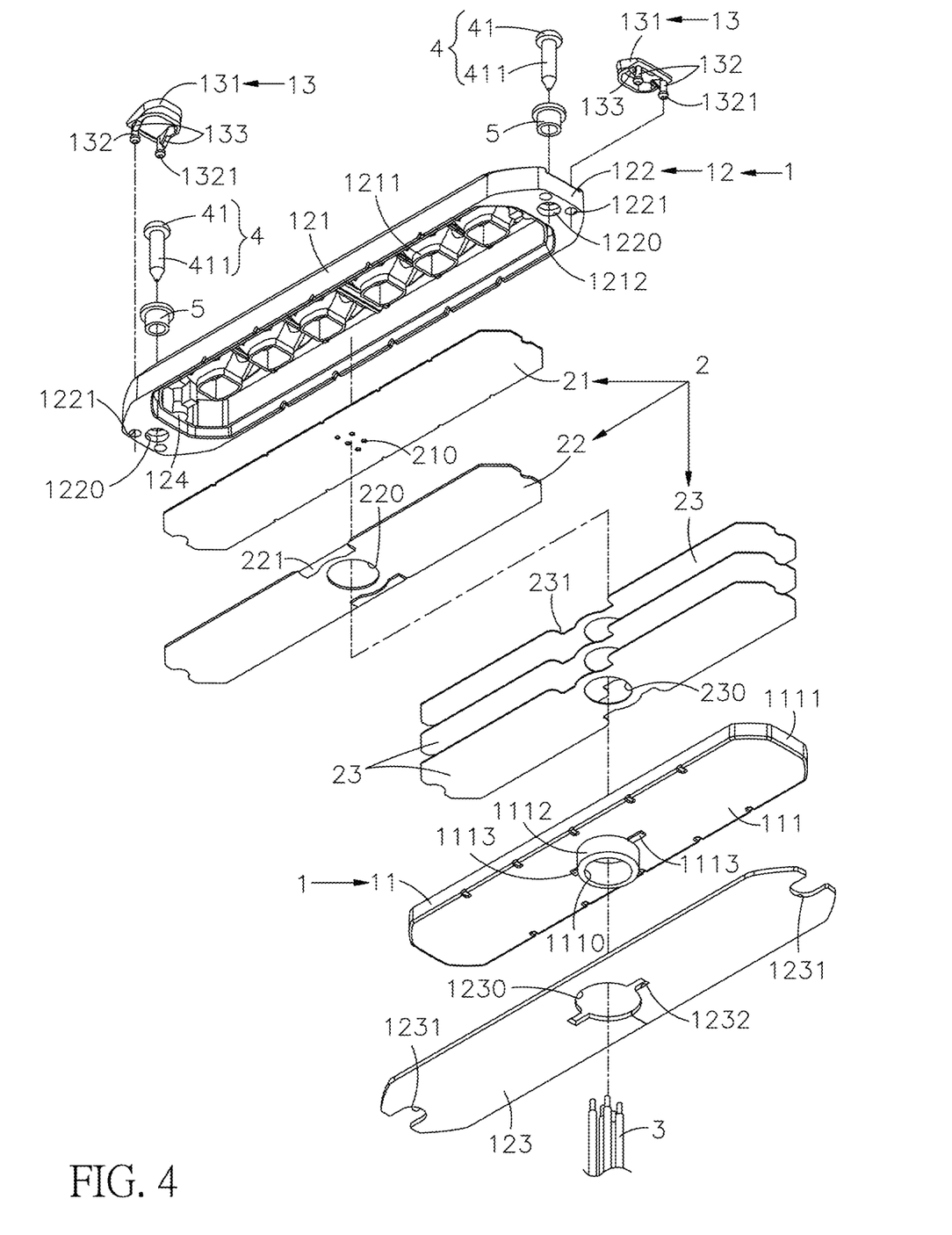
Figure 5:
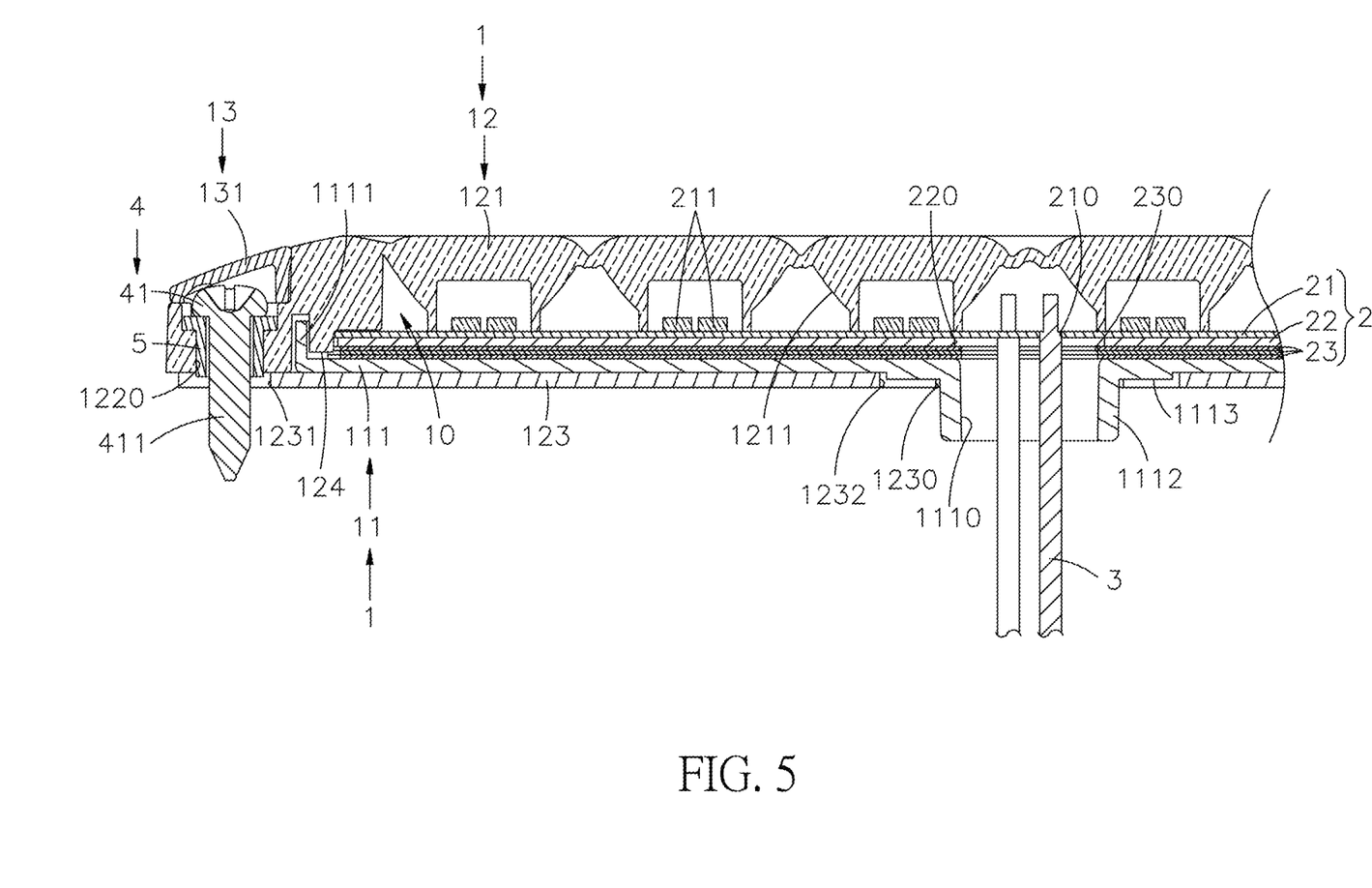
FIG. 5 is a sectional diagram of the warning light according to the embodiment of the present invention.

Please refer to FIG. 1 to FIG. 5. FIG. 1 is a diagram illustrating a warning light on a surface of a vehicle body of a vehicle according to an embodiment of the present invention. FIG. 2A and FIG. 2B are schematic diagrams of the warning light at different views according to the embodiment of the present invention. FIG. 3 and FIG. 4 are exploded diagrams of the warning light at different views according to the embodiment of the present invention. FIG. 5 is a sectional diagram of the warning light according to the embodiment of the present invention. As shown in FIG. 1 to FIG. 5, the warning light includes a light case assembly 1 and a light emitting assembly 2.

The light case assembly 1 includes a base 11, a covering component 12 and two shielding components 13. The covering component 12 is mounted on the base 11. An accommodating space 10 is formed between the base 11 and the covering component 12. The base 11 is made of metal material. The base 111 includes a base plate 111 and a protruding plate 1111. A penetrating hole 1110 is formed on the base plate 111 and configured to allow a plurality of wires 3 to pass therethrough. The protruding plate 1111 is formed on a periphery of the base plate 111 and extends upwardly from the base plate 111 to stretch into the covering component 12.

The base 111 further includes a positioning sleeve 1112 and at least one restraining protrusion 1113. The positioning sleeve 1112 protrudes from a bottom surface of the base plate 111 downwardly and surrounds a periphery of the penetrating hole 1110. The at least one restraining protrusion 1113 protrudes from at least one side of the positioning sleeve 1112. The light case assembly 1 further includes a cushion pad 123. Two avoiding structures 1231 are formed on two lateral sides of the cushion pad 123 for allowing two fastening components 4 to pass therethrough, respectively. In this embodiment, each avoiding structure 1231 can be an avoiding notch with a lateral opening. However, the present invention is not limited to this embodiment. A corresponding hole 1230 is formed on the cushion pad 123 and configured to allow the positioning sleeve 1112 to pass therethrough. At least one restraining hole 1232 is formed on the cushion pad 123 and configured to allow the at least one restraining protrusion 1113 to pass therethrough.

The covering component 12 is made of resilient or deformable material and mounted on the base 111. The covering component 12 includes a main body 121, at least one covering structure 1211 and two fixing portions 122. The at least one covering structure 1211 is disposed inside the main body 121 of the covering component 12. The two fixing portions 122 are located adjacent to two lateral sides of the main body 121 of the covering component 12 for allowing the two fastening components 4 to pass therethrough, respectively. Specifically, a passing hole 1220 is formed on each of the two fixing portions 122 of the covering component 12 and configured to allow the corresponding fastening component 4 to pass therethrough for positioning the corresponding fixing portion 122 onto the surface of the vehicle body of the vehicle, such as a car, which is shown in FIG. 1. Besides, at least one locking hole 1221 is formed on each of the two fixing portions 1220 of the covering component 12 and located beside the corresponding passing hole 1220. Each of the two fixing portions 122 of the covering component 12 includes at least one restraining edge 1222 located adjacent to an upper opening of the corresponding locking hole 1221. The two shielding components 13 are mounted on the two fixing portions 122 of the covering component 12 for concealing the two fastening components 4, respectively. Each of the two shielding components 13 includes a base portion 131, at least one extending portion 132, at least one locking portion 1321, and at least one restraining block 133. The at least one extending portion 132 extends from the base portion 131 and is located at a position corresponding to the corresponding locking hole 1221, and the at least one locking portion 1321 is disposed on an end of the at least one extending portion 132 and configured to engage with the corresponding locking hole 1221. The at least one restraining block 133 extends from the base portion 131 and the at least one extending portion 132 and located at a position corresponding to the at least one restraining edge 1222. The at least one restraining block 133 is configured to cooperate with the at least one restraining edge 1222 for positioning the corresponding shielding component 13 relative to the corresponding fixing portion 122 of the covering component 12. In this embodiment, the at least one restraining edge 1222 includes a first inclined surface, and the at least one restraining block 133 includes a second inclined surface configured to abut against the first inclined surface for facilitating alignment of the shielding component 13 and the fixing portion 122 of the covering component 12. However, the present invention is not limited to this embodiment.

The light emitting assembly 2 is disposed inside the accommodating space 10. The light emitting assembly 2 includes a flexible circuit board 21 and at least one light emitting component 211 disposed on the flexible circuit board 21. A plurality of positioning holes 210 are formed on the flexible circuit board 21 and configured to allow the plurality of wires 3 to pass therethrough for positioning the plurality of wires 3. The light case assembly 1 further includes a first heat dissipating plate 22 and at least one second heat dissipating plate 23. The first heat dissipating plate 22 and the at least one second heat dissipating plate 23 are located at a bottom side of the flexible circuit board 21. The first heat dissipating plate 22 is located between the flexible circuit board 21 and the least one second heat dissipating plate 23. A first wiring hole 220 is formed on the first heat dissipating plate 22 and configured to allow the plurality of wires 3 to pass therethrough. A second wiring hole 230 is formed on each of the at least one second heat dissipating plate 23 and located at a position corresponding to the first wiring hole 220 and configured to allow the plurality of wires 3 to pass therethrough. Besides, in order to enhance structural strength, at least one reinforcing rib 221 protrudes from a bottom surface of the first heat dissipating plate 22 and located beside the first wiring hole 220, and at least one accommodating notch 231 is formed on each of the at least one second heat dissipating plate 23 and configured to accommodate the at least one reinforcing rib 221.

Furthermore, the covering component 12 further includes at least one positioning block 124 located adjacent to at least one of the two lateral sides of the main body 121 of the covering component 12 and configured to abut against a surface of the flexible circuit board 21 for facilitating resilient deformation of the flexible circuit board 21, the first heat dissipating plate 22 and the at least one second heat dissipating plate 23 in response to resilient deformation of the covering component 12.

During assembly, each of the plurality of wires 3 can be routed through the corresponding hole 1230 on the cushion pad 123, the penetrating hole 1110 on the base plate 111, the second wiring hole 230 on each of the at least one second heat dissipating plate 23, the first wiring hole 220 on the first heat dissipating plate 22, and the corresponding positioning hole 210 on the flexible circuit board 21 in sequence from the interior of the vehicle and then electrically connected to the flexible circuit board 21. Afterwards, the covering component 12 can be mounted on the base 11, so as to locate the light emitting assembly 2 inside the accommodating space 10 and to clamp the first heat dissipating plate 22 and the at least one second heat dissipating plate 23 by the flexible circuit board 21, which is pressed by the at least one positioning block 124, and the base plate 111. When the covering component 12 is mounted on the base 11, the at least one covering structure 1211 can cover the at least one light emitting component 211 on the flexible circuit board 21 for guiding light emitted from the at least one light emitting component 211 by refraction and/or reflection. After the covering component 12 is mounted on the base 11, the two fixing portions 122 of the covering component 12 can be positioned on the surface of the vehicle body of the vehicle by the two fastening components 4 passing through the two passing holes 1220 on the two fixing portions 122, respectively. Then, the two shielding components 13 can be mounted on the two fixing portions 122 for concealing the two fastening components 4, respectively, so as to prevent the two fastening components 4 from being exposed to inclement weather with rain or wind for protecting the two fastening components 4. Specifically, when the two shielding components 13 are mounted on the two fixing portions 122, respectively, the at least one extending portion 132 of each of the two shielding components 13 is inserted into the corresponding locking hole 1221, and the base portion 131 covers the corresponding fastening component 4 from the top. It should be noticed that when the light case assembly 1 is positioned on the surface of the vehicle body of the vehicle by the two fastening components 4, the covering component 12, which is made of resilient or deformable material, is resiliently deformed, and the first heat dissipating plate 22, the at least one second heat dissipating plate 23 and the base 11 are resiliently deformed in response to resilient deformation of the covering component 12, such that the light case assembly 1 or the base 11 is seamlessly attached onto the surface of the vehicle body of the vehicle without any gap.

As shown in FIG. 3 to FIG. 5, the first heat dissipating plate 22 and the at least one second heat dissipating plate 23 clamped between the base 11 and the flexible circuit board 21 can rapidly dissipate heat generated by the flexible circuit board 21. It should be noticed that the number of the second heat dissipating plate 23 can be determined according to the amount of the heat generated by the flexible circuit board 21. Preferably, each of the first heat dissipating plate 22 and the at least one second heat dissipating plate 23 is made of metal material and formed in a one-piece structure for providing an integral surface extended between two lateral sides of the flexible circuit board 21 to reduce heat accumulation thereof. The heat received by the at least one second heat dissipating plate 23 can be transferred to the base 11, which is also made of metal material, for achieving efficient heat dissipation. Besides, the configuration of that the at least one reinforcing rib 221 protrudes from the bottom surface of the first heat dissipating plate 22 and passes through the at least one accommodating notch 231 on the at least one second heat dissipating plate 23 can prevent the first heat dissipating plate 22 and the at least one second heat dissipating plate 23 from being cracked when being forced to resiliently deform for achieving an enhanced structural strength.

In addition, a thickness of the first heat dissipating plate 22 and a thickness of the at least one second heat dissipating plate 23 are within the range of 0.1 to 1.5 millimeters. Preferably, the thickness of the first heat dissipating plate 22 and the thickness of the at least one second heat dissipating plate 23 are within the range of 0.2 to 0.8 millimeters. The configuration of the first heat dissipating plate 22 and the at least one second heat dissipating plate 23 can not only achieve enhanced hand feeling when being forced to resiliently deform but also facilitate resilient deformation, comparing with a single integral heat dissipating plate.

It should be noticed that the base 11, the first heat dissipating plate 22 and the at least one second heat dissipating plate 23 can be made of the same metal material or different metal materials. However, the material of the base 11 is not limited to this embodiment. For example, in another embodiment, the base can be made of silicone rubber material or plastic material, such that the base can be resiliently deformed in response to resilient deformation of the covering component.

Furthermore, in this embodiment, the covering structure 1211 has an opening in a rectangular shape. However, the shape of the opening of the covering structure is not limited to this embodiment. For example, in another embodiment, the opening of the covering structure can be formed in a circular shape.

In this embodiment, the covering component 12 further comprises a sealing protruding edge 1212 configured to be attached onto the base plate 111 and surround a periphery of the base plate 111 for preventing environmental substance, e.g., liquid or particles, from entering into the accommodating space 10.

In addition, each of the two fastening component 4 includes a head portion 41 and a rod body 411 extending from the head portion 41 downwardly. An outer diameter of the rod body 411 is less than an outer diameter of the head portion 41. The light case assembly 1 further includes two fastening sleeves 5 disposed on the two fixing portions 122 of the covering component 12, respectively, and each of the two fastening sleeves 5 is configured to allow the rod body 411 of the corresponding fastening component 4 to pass therethrough for positioning the corresponding fastening component 4.

In this embodiment, the fastening component 4 can be a threaded component, e.g., a screw component. However, the present invention is not limited to this embodiment. For example, in another embodiment, the fastening component can be a rivet.

In this embodiment, the shielding component 13 is an independent component which can be separated from the main body of the covering component when being removed from the fixing portion 122. However, the present invention is not limited to this embodiment. For example, in another embodiment, the shielding component can be integrally connected to the main body of the covering component.

Figure 6:
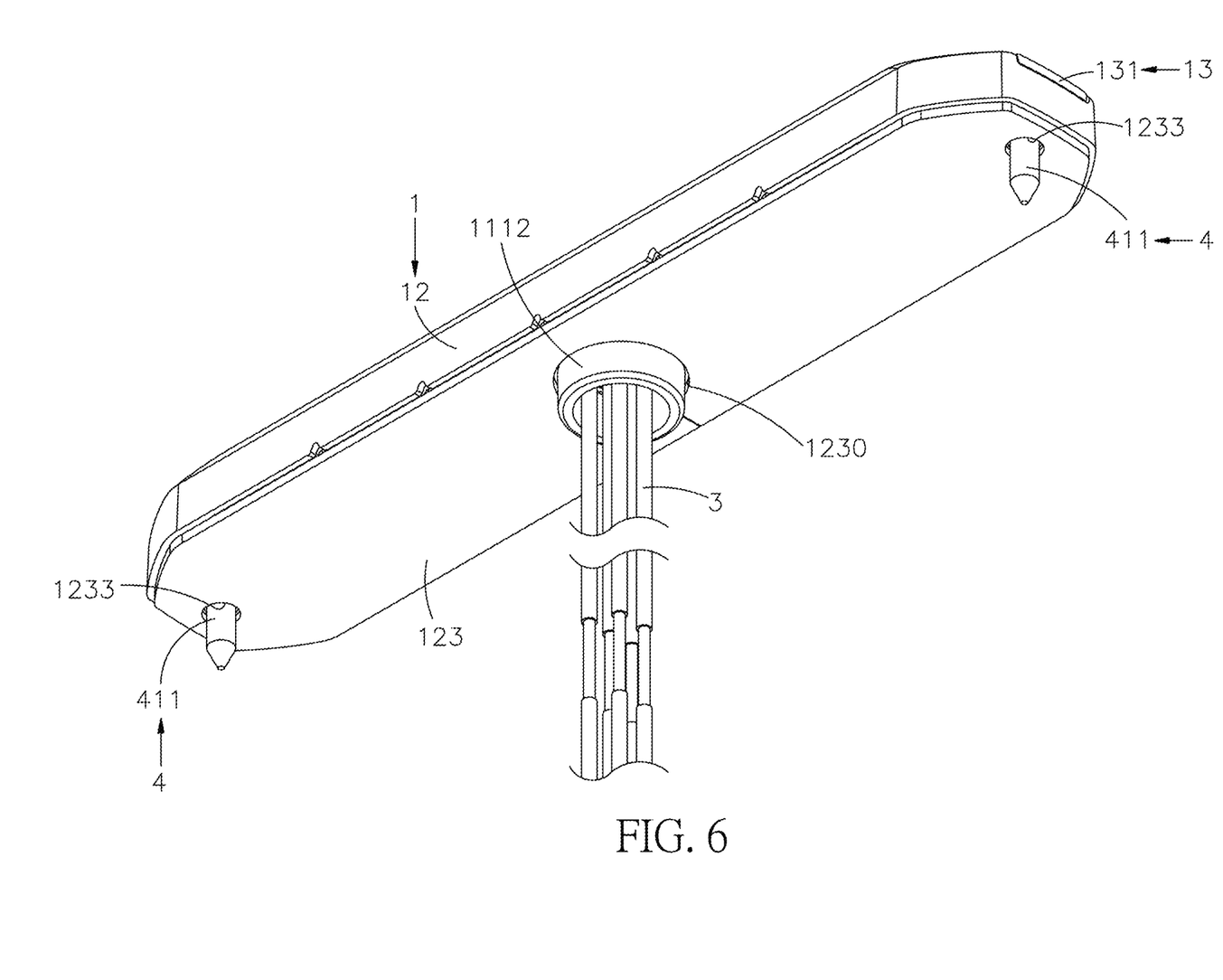
FIG. 6 is a schematic diagram of a warning light according to another embodiment of the present invention.

Please further refer to FIG. 6. FIG. 6 is a schematic diagram of a warning light according to another embodiment of the present invention. As shown in FIG. 6, different from the aforementioned embodiment, the warning light has no restraining protrusion on the positioning sleeve 1112 and no restraining hole on the cushion pad 123. Each of two avoiding structures 1233 formed on the cushion pad 123 is an avoiding hole for allowing the corresponding rod body 411 to pass therethrough. Other details of this embodiment are the same as the aforementioned embodiment. Detailed description is omitted herein for simplicity.

In contrast to the prior art, the present invention is configured to utilize the fastening component passing through the fixing portion for resiliently deforming the light case assembly in a curved shape and further to utilize the shielding component mounted on the fixing portion for concealing the fastening component to protect the fastening component from being corroded due to exposure to inclement weather with rain or wind. Therefore, the present invention has extended service life. In addition, the present invention is configured to utilize the light case assembly for resiliently deforming the first heat dissipating plate and the at least one second heat dissipating plate, so as to drive the base to resiliently deform to be seamlessly attached onto the surface of the vehicle body of the vehicle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A warning light comprising:
   a light case assembly comprising:
      a base comprising a base plate;
      a covering component made of resilient or deformable material and mounted on the base, an accommodating space being formed between the base and the covering component, the covering component comprising a main body and two fixing portions located adjacent to two lateral sides of the main body of the covering component, respectively, and each of the two fixing portions being configured to allow a fastening component to pass therethrough; and
      two shielding components mounted on the two fixing portions of the covering component for concealing the two fastening components, respectively; and
   a light emitting assembly disposed inside the accommodating space, the light emitting assembly comprising:
      a flexible circuit board; and
      at least one light emitting component disposed on the flexible circuit board;
   wherein when the light case assembly is positioned on a surface of a vehicle body of a vehicle by the two fastening components, the covering component is configured to be resiliently deformed, such that the light case assembly is attached onto the surface of the vehicle body of the vehicle.

2. The warning light of claim 1, wherein a passing hole is formed on each of the two fixing portions of the covering component and configured to allow a corresponding one of the two fastening components to pass therethrough.

3. The warning light of claim 1, wherein at least one locking hole is formed on each of the two fixing portions of the covering component, each of the two shielding components comprises a base portion, at least one extending portion and at least one locking portion, the at least one extending portion extends from the base portion and is located at a position corresponding to the corresponding locking hole, and the at least one locking portion is disposed on an end of the at least one extending portion and configured to engage with the corresponding locking hole.

4. The warning light of claim 3, wherein each of the two fixing portions of the covering component comprises at least one restraining edge located adjacent to an upper opening of the at least one locking hole, each of the two shielding components further comprises at least one restraining block extending from the base portion and the at least one extending portion and located at a position corresponding to the at least one restraining edge, and the at least one restraining block is configured to cooperate with the at least one restraining edge.

5. The warning light of claim 4, wherein the at least one restraining edge comprises a first inclined surface, and the at least one restraining block comprises a second inclined surface configured to abut against the first inclined surface.

6. The warning light of claim 1, further comprising a first heat dissipating plate and at least one second heat dissipating plate, the first heat dissipating plate and the at least one second heat dissipating plate being located at a bottom side of the flexible circuit board, the first heat dissipating plate being located between the flexible circuit board and the least one second heat dissipating plate, a first wiring hole being formed on the first heat dissipating plate and configured to allow a wire to pass therethrough, and a second wiring hole being formed on the at least one second heat dissipating plate and located at a position corresponding to the first wiring hole and configured to allow the wire to pass therethrough.

7. The warning light of claim 6, wherein at least one reinforcing rib protrudes from a bottom surface of the first heat dissipating plate and located beside the first wiring hole, and at least one accommodating notch is formed on the at least one second heat dissipating plate and configured to accommodate the at least one reinforcing rib.

8. The warning light of claim 6, wherein a thickness of the first heat dissipating plate and a thickness of the at least one second heat dissipating plate are 0.1 to 1.5 millimeters.

9. The warning light of claim 6, wherein the first heat dissipating plate, the at least one second heat dissipating plate and the base plate are made of metal material.

10. The warning light of claim 1, wherein the base further comprises a protruding plate formed on a periphery of the base plate and extending upwardly from the base plate to stretch into the covering component.

11. The warning light of claim 1, wherein the covering component further comprises at least one covering structure configured to cover the at least one light emitting component.

12. The warning light of claim 1, wherein the covering component further comprises at least one positioning block located adjacent to at least one of the two lateral sides of the main body of the covering component and configured to abut against a surface of the flexible circuit board.

13. The warning light of claim 1, wherein the covering component further comprises a sealing protruding edge configured to be attached onto the base plate and surround a periphery of the base plate.

14. The warning light of claim 1, wherein a penetrating hole is formed on the base plate and configured to allow a plurality of wires to pass therethrough, and a plurality of positioning holes are formed on the flexible circuit board and configured to allow the plurality of wires to pass therethrough.

15. The warning light of claim 14, wherein the light case assembly further comprises a cushion pad mounted on a bottom surface of the base plate.

16. The warning light of claim 15, wherein the base further comprises a positioning sleeve protruding from the bottom surface of the base plate downwardly, and a corresponding hole is formed on the cushion pad and configured to allow the positioning sleeve to pass therethrough.

17. The warning light of claim 16, wherein the base further comprises at least one restraining protrusion protruding from at least one side of the positioning sleeve, and at least one restraining hole is formed on the cushion pad and configured to allow the at least one restraining protrusion to pass therethrough.

18. The warning light of claim 15, wherein two avoiding structures are formed on two lateral sides of the cushion pad, respectively, and each of the two avoiding structures is configured to allow a corresponding one of the two fastening components to pass therethrough.

19. The warning light of claim 18, wherein the two avoiding structures are two avoiding notches or two avoiding holes.

20. The warning light of claim 1, wherein the light case assembly further comprises two fastening sleeves disposed on the two fixing portions of the covering component, respectively, and each of the two fastening sleeves is configured to allow a corresponding one of the two fastening components to pass therethrough for positioning the corresponding one of the two fastening components.

\* \* \* \* \*